US 8,242,900 B2

(12) United States Patent
Bennett, III et al.

(10) Patent No.: US 8,242,900 B2
(45) Date of Patent: *Aug. 14, 2012

(54) SYSTEM AND METHOD FOR HOME AUTOMATION AND SECURITY

(75) Inventors: Raymond Walden Bennett, III, Naperville, IL (US); Laura Marie Griffith, Dundee, IL (US); Arnold M. Lund, Louisville, CO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/250,597

(22) Filed: Sep. 30, 2011

(65) Prior Publication Data

US 2012/0023151 A1 Jan. 26, 2012

Related U.S. Application Data

(63) Continuation of application No. 12/425,273, filed on Apr. 16, 2009, now Pat. No. 8,063,761, which is a continuation of application No. 11/438,265, filed on May 22, 2006, now Pat. No. 7,551,071, which is a continuation of application No. 08/999,106, filed on Dec. 29, 1997, now abandoned.

(51) Int. Cl.
*G08B 29/00* (2006.01)
(52) U.S. Cl. .......... 340/506; 340/517; 340/521; 340/3.1
(58) Field of Classification Search .................. 340/506, 340/511, 517, 521, 541, 3.1; 379/45
See application file for complete search history.

(56) References Cited

U.S. PATENT DOCUMENTS

| 4,021,615 A | 5/1977 | James et al. |
| 4,442,319 A | 4/1984 | Treidl |
| 4,511,886 A | 4/1985 | Rodriguez |
| 4,540,851 A | 9/1985 | Hashimoto |
| 4,653,085 A | 3/1987 | Chan et al. |
| 4,656,655 A | 4/1987 | Hashimoto |
| 4,658,096 A | 4/1987 | West et al. |
| 4,683,460 A | 7/1987 | Nakatsugawa |

(Continued)

FOREIGN PATENT DOCUMENTS

DE 3529167 2/1987
(Continued)

OTHER PUBLICATIONS

United States Patent and Trademark Office, Office Action, issued in connection with U.S. Appl. No. 08/999,106, mailed Nov. 16, 1998 (5 pages).

(Continued)

*Primary Examiner* — Daryl Pope
(74) *Attorney, Agent, or Firm* — Hanley, Flight & Zimmerman, LLC

(57) ABSTRACT

A home automation and security system is provided in which a home automation and security controller in a customer premises is coupled with a remotely located central control facility using a continuous connectivity access line providing a data channel separate from a voice channel. The controller at the customer premises is responsible for monitoring and applying control signals to devices in the home and for supporting a human interface. The remotely located central control facility is responsible for providing the computational and database resources to the controller. By redistributing functionality, the network-based structure of this home automation and security system can overcome the disadvantages of conventional home automation and security systems.

20 Claims, 6 Drawing Sheets

U.S. PATENT DOCUMENTS

| | | | |
|---|---|---|---|
| 4,885,766 A | 12/1989 | Yasuoka et al. | |
| 5,086,385 A | 2/1992 | Launey et al. | |
| 5,109,407 A | 4/1992 | Fujita et al. | |
| 5,164,982 A | 11/1992 | Davis | |
| 5,268,666 A | 12/1993 | Michel et al. | |
| 5,287,515 A | 2/1994 | Murai | |
| 5,291,479 A | 3/1994 | Vaziri et al. | |
| 5,311,507 A | 5/1994 | Bedrossian | |
| 5,349,633 A | 9/1994 | Katz | |
| 5,369,700 A | 11/1994 | Koura et al. | |
| 5,392,345 A | 2/1995 | Otto | |
| 5,400,246 A | 3/1995 | Wilson et al. | |
| 5,434,395 A | 7/1995 | Storck et al. | |
| 5,461,372 A | 10/1995 | Busak et al. | |
| 5,469,496 A | 11/1995 | Emery et al. | |
| 5,475,735 A | 12/1995 | Williams et al. | |
| 5,479,491 A | 12/1995 | Herrero Garcia et al. | |
| 5,506,892 A | 4/1996 | Kojima et al. | |
| 5,526,413 A | 6/1996 | Cheston, III et al. | |
| 5,528,258 A | 6/1996 | Moon | |
| 5,528,285 A | 6/1996 | Morikawa et al. | |
| 5,528,666 A | 6/1996 | Weigand et al. | |
| 5,550,649 A | 8/1996 | Wong et al. | |
| 5,553,223 A | 9/1996 | Greenlee et al. | |
| 5,555,258 A | 9/1996 | Snelling et al. | |
| 5,570,085 A | 10/1996 | Bertsch | |
| 5,572,438 A | 11/1996 | Ehlers et al. | |
| 5,572,572 A | 11/1996 | Kawan et al. | |
| 5,577,118 A | 11/1996 | Sasaki et al. | |
| 5,581,593 A | 12/1996 | Engelke et al. | |
| 5,583,920 A | 12/1996 | Wheeler, Jr. | |
| 5,592,538 A | 1/1997 | Kosowsky et al. | |
| 5,598,456 A | 1/1997 | Feinberg | |
| 5,602,837 A | 2/1997 | Takahashi | |
| 5,603,095 A | 2/1997 | Uola | |
| 5,610,910 A | 3/1997 | Focsaneanu et al. | |
| 5,610,972 A | 3/1997 | Emery et al. | |
| 5,640,444 A | 6/1997 | O'Sullivan | |
| 5,644,629 A | 7/1997 | Chow | |
| 5,664,003 A | 9/1997 | Foladare et al. | |
| 5,742,756 A | 4/1998 | Dillaway et al. | |
| 5,774,357 A | 6/1998 | Hoffberg et al. | |
| 5,917,405 A | 6/1999 | Joao | |
| 5,939,980 A | 8/1999 | Heitmann et al. | |
| 5,971,597 A | 10/1999 | Baldwin et al. | |
| 6,021,324 A | 2/2000 | Sizer, II et al. | |
| 6,032,034 A | 2/2000 | Rabina et al. | |
| 6,058,104 A | 5/2000 | Snelling et al. | |
| 6,097,966 A | 8/2000 | Hanley | |
| 6,141,356 A | 10/2000 | Gorman | |
| 6,188,895 B1 | 2/2001 | Schmitz et al. | |
| 6,226,368 B1 | 5/2001 | Teich et al. | |
| 6,343,217 B1 | 1/2002 | Borland | |
| 6,389,292 B2 | 5/2002 | Biedermann | |
| 6,470,179 B1 | 10/2002 | Chow et al. | |
| 6,532,361 B1 | 3/2003 | Kamperschroer | |
| 6,542,753 B1 | 4/2003 | Swenson | |
| 6,546,253 B1 | 4/2003 | Chow et al. | |
| 6,556,586 B1 | 4/2003 | Sipila | |
| 6,594,488 B1 | 7/2003 | Chow et al. | |
| 6,625,443 B1 | 9/2003 | Kamperschroer et al. | |
| 7,027,566 B2 | 4/2006 | Bossemeyer et al. | |
| 7,174,175 B2 | 2/2007 | Uang et al. | |
| 7,349,682 B1 | 3/2008 | Bennett et al. | |
| 7,525,990 B2 | 4/2009 | Bossemeyer et al. | |
| 7,551,071 B2 | 6/2009 | Bennett, III et al. | |
| 7,596,129 B2 | 9/2009 | Bossemeyer et al. | |
| 7,738,872 B1 | 6/2010 | Chow et al. | |
| 8,063,761 B2 * | 11/2011 | Bennett et al. | 340/506 |
| 2002/0037004 A1 | 3/2002 | Bossemeyer et al. | |
| 2003/0027565 A1 | 2/2003 | Bossemeyer et al. | |
| 2005/0108091 A1 | 5/2005 | Sotak et al. | |
| 2006/0140356 A1 | 6/2006 | Bossemeyer et al. | |
| 2006/0220830 A1 | 10/2006 | Bennett et al. | |
| 2007/0127510 A1 | 6/2007 | Bossemeyer et al. | |
| 2008/0074258 A1 | 3/2008 | Bennett et al. | |
| 2009/0201921 A1 | 8/2009 | Bossemeyer et al. | |

FOREIGN PATENT DOCUMENTS

| | | |
|---|---|---|
| JP | 07103493 | 4/1995 |
| WO | 99/53654 | 10/1999 |

OTHER PUBLICATIONS

United States Patent and Trademark Office, Office Action, issued in connection with U.S. Appl. No. 08/999,106, mailed Jun. 8, 1999 (5 pages).

United States Patent and Trademark Office, Office Action, issued in connection with U.S. Appl. No. 08/999,106, mailed Sep. 28, 1999 (5 pages).

United States Patent and Trademark Office, Office Action, issued in connection with U.S. Appl. No. 08/999,106, mailed Nov. 8, 1999 (12 pages).

United States Patent and Trademark Office, Office Action, issued in connection with U.S. Appl. No. 08/999,106, mailed Jul. 5, 2000 (10 pages).

United States Patent and Trademark Office, Office Action, issued in connection with U.S. Appl. No. 08/999,106, mailed Jul. 30, 2003 (10 pages).

United States Patent and Trademark Office, Office Action, issued in connection with U.S. Appl. No. 08/999,106, mailed Jan. 12, 2005 (5 pages).

United States Patent and Trademark Office, Office Action, issued in connection with U.S. Appl. No. 08/999,106, mailed Oct. 3, 2005 (2 pages).

United States Patent and Trademark Office, Office Action, issued in connection with U.S. Appl. No. 08/999,106, mailed Oct. 4, 2005 (2 pages).

United States Patent and Trademark Office, Office Action, issued in connection with U.S. Appl. No. 11/438,265, mailed Sep. 28, 2007 (6 pages).

United States Patent and Trademark Office, Office Action, issued in connection with U.S. Appl. No. 11/438,265, mailed Jun. 10, 2008 (5 pages).

United States Patent and Trademark Office, Office Action, issued in connection with U.S. Appl. No. 11/438,265, mailed Jan. 14, 2009 (4 pages).

United States Patent and Trademark Office, Examiner Interview Summary, issued in connection with U.S. Appl. No. 08/999,106, mailed Oct. 24, 2000, (1 page).

United States Patent and Trademark Office, Advisory Action, issued in connection with U.S. Appl. No. 08/999,106, mailed Oct. 26, 2000, (2 pages).

Notice of Allowance issued by the United States Patent and Trademark Office in connection with U.S. Appl. No. 09/096,560 on Dec. 12, 2007 (4 pages).

Office action issued by the United States Patent and Trademark Office in connection with U.S. Appl. No. 09/096,560 on Aug. 15, 2007 (3 pages).

Office action issued by the United States Patent and Trademark Office in connection with U.S. Appl. No. 09/096,560 on Jun. 7, 2007 (17 pages).

Office action issued by the United States Patent and Trademark Office in connection with U.S. Appl. No. 09/096,560 on Dec. 4, 2006 (13 pages).

Office action issued by the United States Patent and Trademark Office in connection with U.S. Appl. No. 09/096,560 on Nov. 30, 2004(18 pages).

Office action issued by the United States Patent and Trademark Office in connection with U.S. Appl. No. 09/096,560 on Aug. 2, 2001 (12 pages).

Office action issued by the United States Patent and Trademark Office in connection with U.S. Appl. No. 09/096,560 on May 18, 2001 (12 pages).

Office action issued by the United States Patent and Trademark Office in connection with U.S. Appl. No. 09/096,560 on Jan. 10, 2001 (3 pages).

Office action issued by the United States Patent and Trademark Office in connection with U.S. Appl. No. 09/096,560 on Nov. 22, 2000 (10 pages).

Office action issued by the United States Patent and Trademark Office in connection with U.S. Appl. No. 09/096,560 on Jul. 10, 2000 (7 pages).

"Computers and Telecomunications—More, Better, Faster, Cheaper," A Bulletin issued on Sep. 13, 1997 (9 pages). (Submitted in connection with U.S. Appl. No. 12/425,273, to which the instant application claims priority).

AT&T Learning Network, Blueprint of the Technology Diagrams issued, May 27, 1997 (2 pages). (Submitted in connection with U.S. Appl. No. 12/425,273, to which the instant application claims priority).

Lucent Technologies, "Bell Labs Technology, Trends, and Developments," Apr. 1997 (11 pages). (Submitted in connection with U.S. Appl. No. 12/425,273, to which the instant application claims priority).

Perry Laforge, "What is in a Name?" col. One Article, Aug. 20, 1997 (3 pages). (Submitted in connection with U.S. Appl. No. 12/425,273, to which the instant application claims priority).

The specification, claims, abstract, and figures for U.S. Appl. No. 09/061,833, which was filed on Apr. 16, 1998, and abandoned on Feb. 24, 2003, for failure to respond to an Office action (47 pages). (Submitted in connection with U.S. Appl. No. 12/425,273, to which the instant application claims priority).

The Yankee Group, "Wireless as Access: AT&T Reaches for the Holy Grail," vol. 14, No. 2 of the Consumer Communications Bulletin issued in Mar. 1997 (5 pages). (Submitted in connection with U.S. Appl. No. 12/425,273, to which the instant application claims priority).

Reitman, AT&T Announces Fixed Wireless Alternative to Local Service, EDGE Publishing, Mar. 3, 1997, vol. 12 pp. 1-5. (Submitted in connection with U.S. Appl. No. 12/425,273, to which the instant application claims priority).

Office action issued by the United States Patent and Trademark Office in connection with U.S. Appl. No. 11/952,830 on May 24, 2010 (7 pages).

Office action issued by the United States Patent and Trademark Office in connection with U.S. Appl. No. 11/952,830 on Jul. 22, 2010 (8 pages).

Office action issued by the United States Patent and Trademark Office in connection with U.S. Appl. No. 08/999,106 on Oct. 26, 2000 (3 pages).

Notice of Allowance issued by the United States Patent and Trademark Office on Dec. 30, 2010 in connection with U.S. Appl. No. 11/952,830 (5 pages).

Notice of Allowance issued by the United States Patent and Trademark Office on Jul. 8, 2011 in connection with U.S. Appl. No. 12/425,273 (7 pages).

Office action issued by the United States Patent and Trademark Office in connection with U.S. Appl. No. 12/425,273 on Jan. 3, 2011 (5 pages).

Office action issued by the United States Patent and Trademark Office in connection with U.S. Appl. No. 12/425,273 on Sep. 20, 2010 (5 pages).

* cited by examiner

SYSTEM AND METHOD FOR HOME AUTOMATION AND SECURITY

RELATED APPLICATIONS

This patent arises from a continuation of U.S. patent application Ser. No. 12/425,273, filed on Apr. 16, 2009, now U.S. Pat. No. 8,063,761, which is a continuation of U.S. patent application Ser. No. 11/438,265, filed on May 22, 2006, now U.S. Pat. No. 7,551,071, which is a continuation of U.S. patent application Ser. No. 08/999,106, filed on Dec. 29, 1997, now abandoned U.S. application Ser. No. 12/425,273, U.S. application Ser. No. 11/438,265, and U.S. application Ser. No. 08/999,106 are hereby incorporated herein in their entireties.

TECHNICAL FIELD

The present invention relates generally to telecommunication services and more specifically to a new system and method for home automation and security.

BACKGROUND

Home automation and security systems currently are controlled by equipment installed at a customer premises. By programming an in-house device, a user controls the operation of appliances connected to the system. For example, a user can program an in-house device to turn on a light at a specific time. The in-house device also can monitor sensors located throughout the house and can sound an alarm or phone a monitoring agency when the sensors are triggered. Some systems offer a remote access feature allowing a user to access the in-house device through the public switched telephone system.

There are several disadvantages associated with conventional home automation and security systems. First, most systems use relatively simple user interfaces that limit the user's control over the system. To provide a more elaborate and friendly user interface, some systems incorporate, or provide a connection to, a device comparable to a personal computer. While these systems provide the user with better home automation and security functionality, their high cost limits their wide-spread use. Additionally, changing built-in control programs typically requires a change to the in-house equipment itself. Further, using the remote-access feature of the conventional systems interferes with normal use of the home telephone.

There is, therefore, a need for a new system and method for home automation and security that will overcome the disadvantages described above.

DETAILED DESCRIPTION OF THE PRESENTLY PREFERRED EMBODIMENTS

Figure 2:
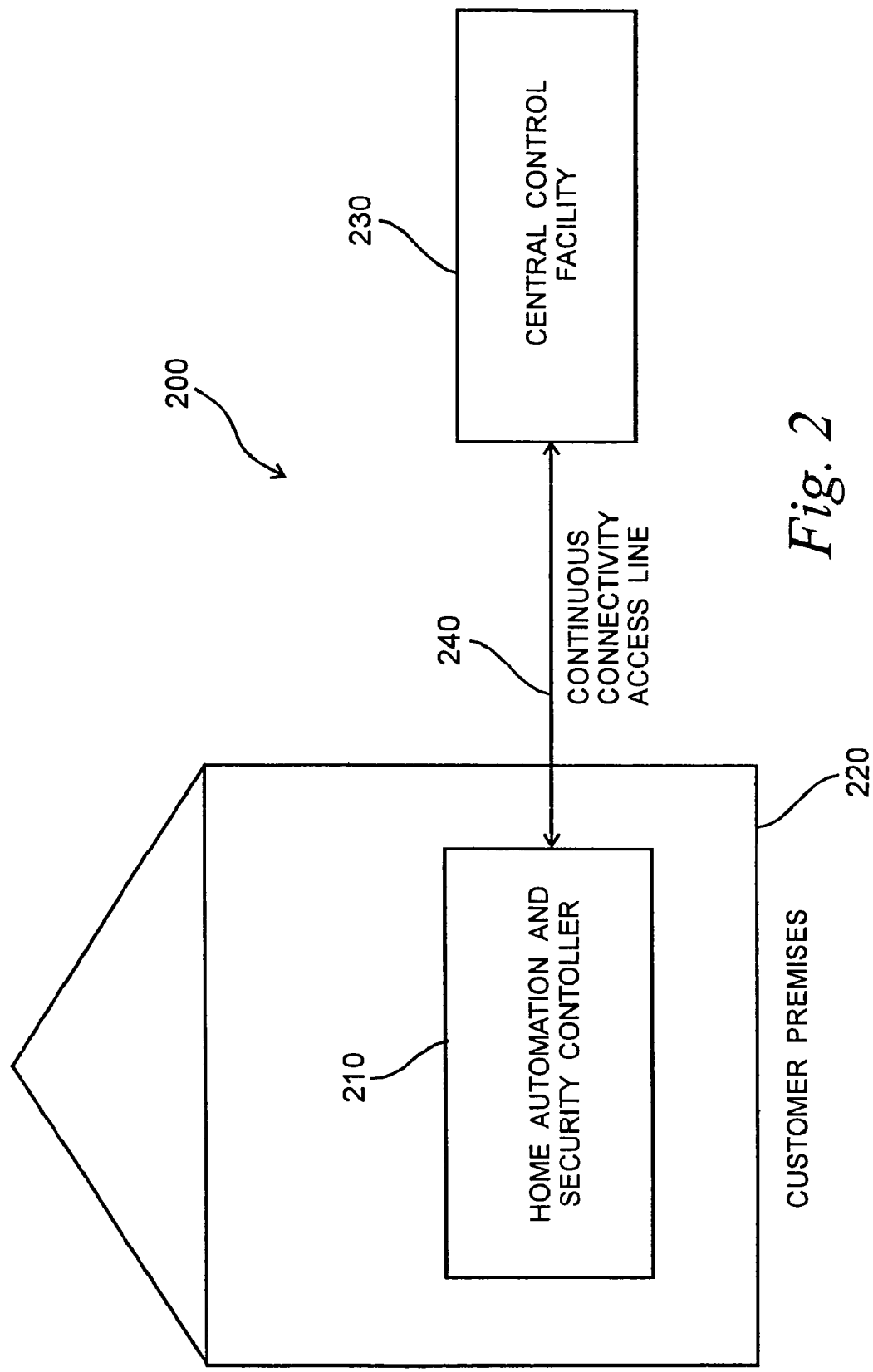
FIG. 2 is a block diagram of a home automation and security system of a preferred embodiment.

Now turning to the drawings, FIG. 2 is a block diagram of a home automation and security system 200 of a preferred embodiment. As shown in FIG. 2, a home automation and security controller 210 in a customer premises 220 is coupled with a remotely-located central control facility 230 using a continuous connectivity access line 240. In one preferred embodiment, the continuous connectivity access line is supported by data-over-voice (DOV) modems, while in another preferred embodiment the access line is supported by a Digital Subscriber Line (xDSL). In both embodiments, the access line 240 has a data channel separate from a voice channel. Unlike conventional systems, the home automation and security controller 210 at the customer premises 220 is responsible for monitoring and applying control signals to devices in the home and for supporting a human interface, while the computational and database resources of the system 200 are provided to the controller 210 (and controllers of other customer premises) by the remotely-located central control facility 230.

With such redistributed functionality, the network-based structure of this home automation and security system overcomes the disadvantages of conventional home automation and security systems. First, the system described below offers a more intensive computational facility as compared to current systems. Because the computational resources are centralized, updating or replacing control software does not require changes to customer premises equipment. Further, the system has access to external databases, allowing more powerful and versatile forms of home automation and security. Second, this system offers a more sophisticated user interface (such as an elaborate, graphical or speech-based user interface) without requiring the use of a personal computer or comparably powerful and expensive dedicated processor at the customer premises. Third, unlike the remote access feature of a conventional system which typically requires input of touch-tone signals with only tones as prompts, the remote access feature of these preferred embodiments supports user-friendly Interactive Voice Response units and allows users to access their home system using a personal computer. Additionally, because the access line has a data channel separate from the voice channel, the remote access feature of these preferred embodiments does not interfere with normal use of the home telephone.

Figure 3:
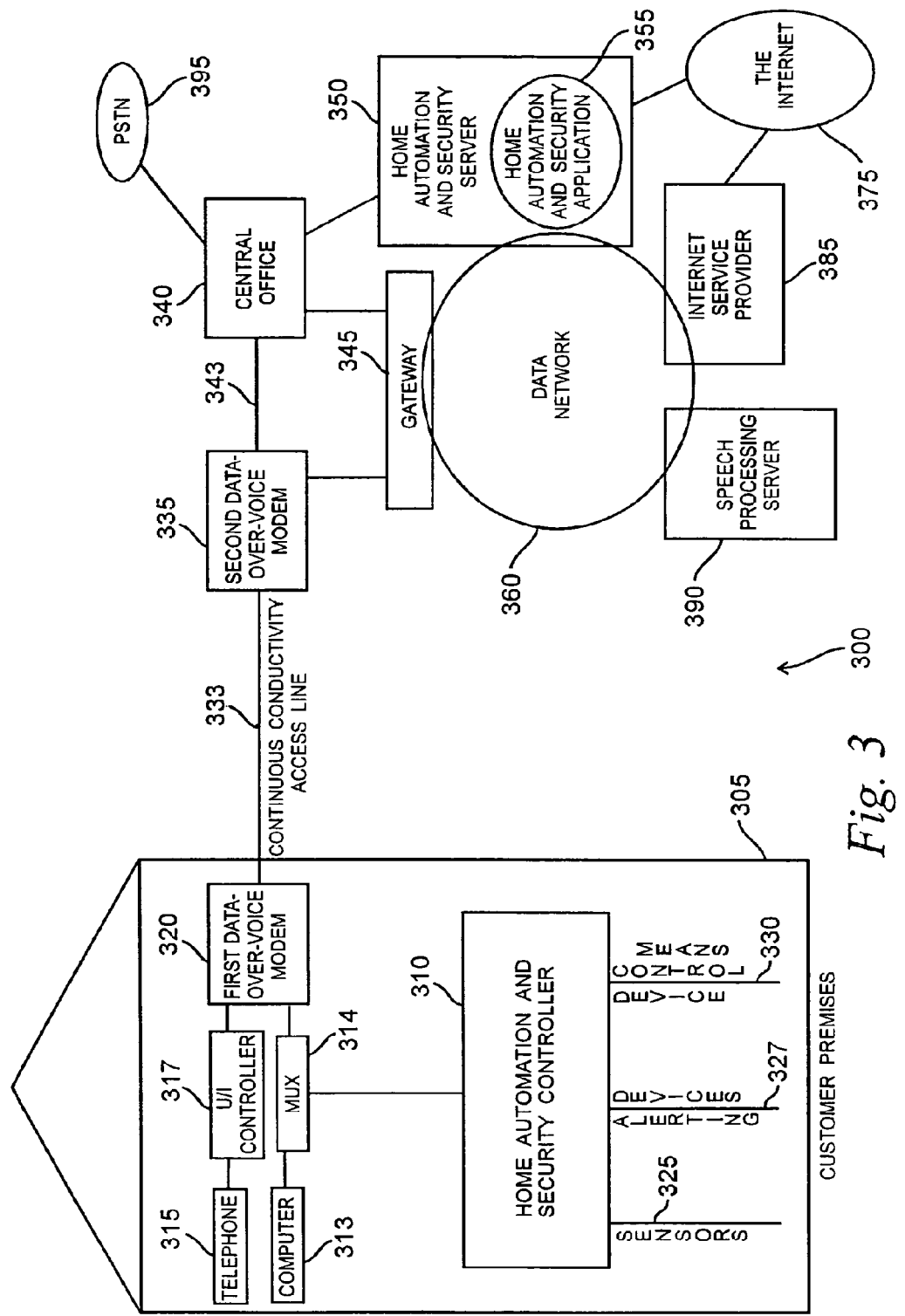
FIG. 3 is a block diagram of a home automation and security system of a preferred embodiment that uses data-over-voice modems.

Referring again to the drawings, FIG. 3 is a block diagram of a home automation and security system 300 of a preferred embodiment in which the continuous connectivity access line is supported by data-over-voice (DOV) modems. FIG. 3 shows equipment at a customer premises 305 and equipment remotely located from the customer premises 305. The customer premises 305 comprises a home automation and security controller 310, a telephone 315, and a user-interface controller 317, all of which are coupled with a first data-over-voice modem 320. As used herein, the term "coupled with" means directly coupled with or indirectly coupled with through one or more components. The first data-over-voice modem 320 simultaneously transports voice and data traffic (nominally 56 Kbps) through a twisted pair local loop. The controller 310 comprises sensors 325 and alerting devices 327 to perform home security functions and device control means 330 to control the operation of devices coupled with the controller 310 in the customer premises 305. Device control means 330 are well known in the art and can comprise any convenient transport medium, such as but not limited to twisted pairs, in-home electrical wiring, power lines, or a free-field electromagnetic or optical connection. For example, to control a VCR, the device control means 330 can comprise an infra-red emitter to communicate with an infra-red receiver used for the VCR remote control. The transport protocol can be RS-232, RS-485, X-10, LonWorks, CEBus, or any other transport protocol that meets the cost, bandwidth, and reliability requirements for a particular installation.

Remotely located from the customer premises 305 is a second data-over-voice modem 335, which is coupled to a central office 340 with a POTS line 343 and a gateway 345 (preferably with a T1 line). The second data-over-voice modem 335 separates the data and voice traffic and sends the signals to the gateway 345 and a line card in the central office 340, respectively. The central office 340 is coupled to the public switched telephone network ("PSTN") 395. The gateway 345 is coupled with a home automation and security server 350, which comprises a home automation and security application 355, through a data network 360. The data network 360 (which can be SONET with ATM or any other comparable network technology) can comprise any number of computer data network devices or can be a single connection directly coupling the gateway 345 with the server 350. The data network 360 also can couple a speech processing server 390 and an Internet service provider 385 coupled with the Internet 375.

Unlike conventional systems, the controller 310 at the customer premises 305 is responsible for monitoring and applying control signals to devices in the home and for supporting a human interface, while the computational and database resources of the system 300 are provided to the controller 310 (and controllers of other customer premises) by the application 355. It is important to note that controller 310-server 350 communication does not involve the POTS line or the public switched telephone network 395. As described below, even communication with a user in the customer premises 305, whether via dialed digits or a spoken commands command, is sent as packets over the data channel.

Figure 4:
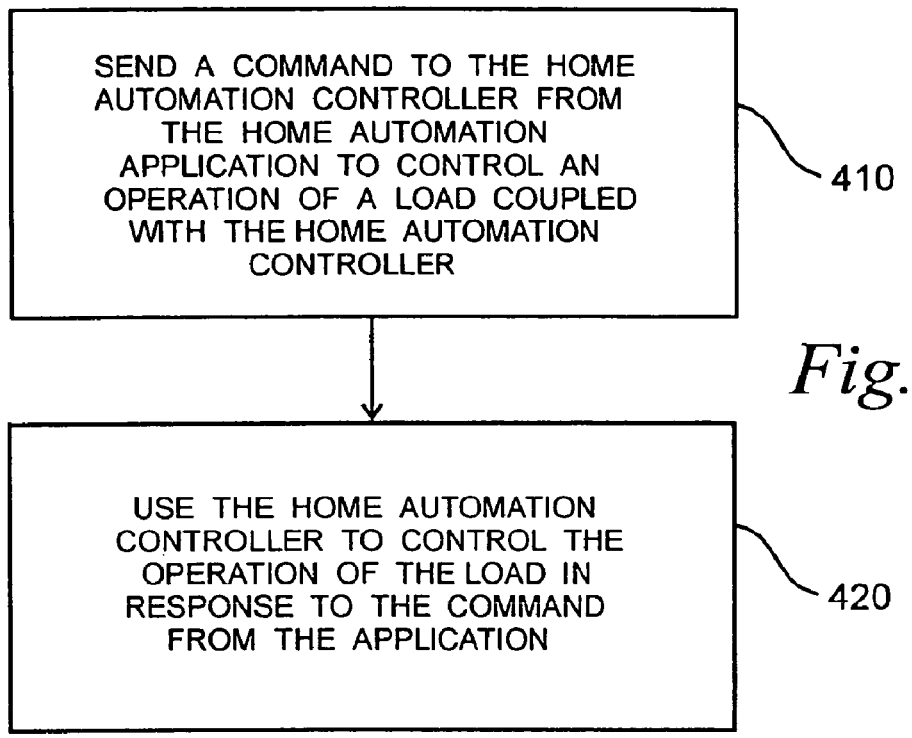
FIG. 4 is a flow chart of a home automation method of a preferred embodiment.

The system 300 of FIG. 3 can be used in a home automation method, as illustrated in the flow chart of FIG. 4. As shown in FIG. 4, this method comprises the steps of sending a command to the home automation controller 310 from the home automation application 355 to control an operation of a load coupled with the home automation controller 310 (step 410) and then using the home automation controller 310 to control the operation of the load in response to the command from the application 355 (step 420). For example, the application 355 can be programmed to turn on lights in the customer premises 305 at a specific time using the device control means 330. At the appropriate time, the application 355 contacts the controller 310 via the access channel 333 and commands the controller 310 to use the device control means 330 to turn on the lights.

Figure 5:
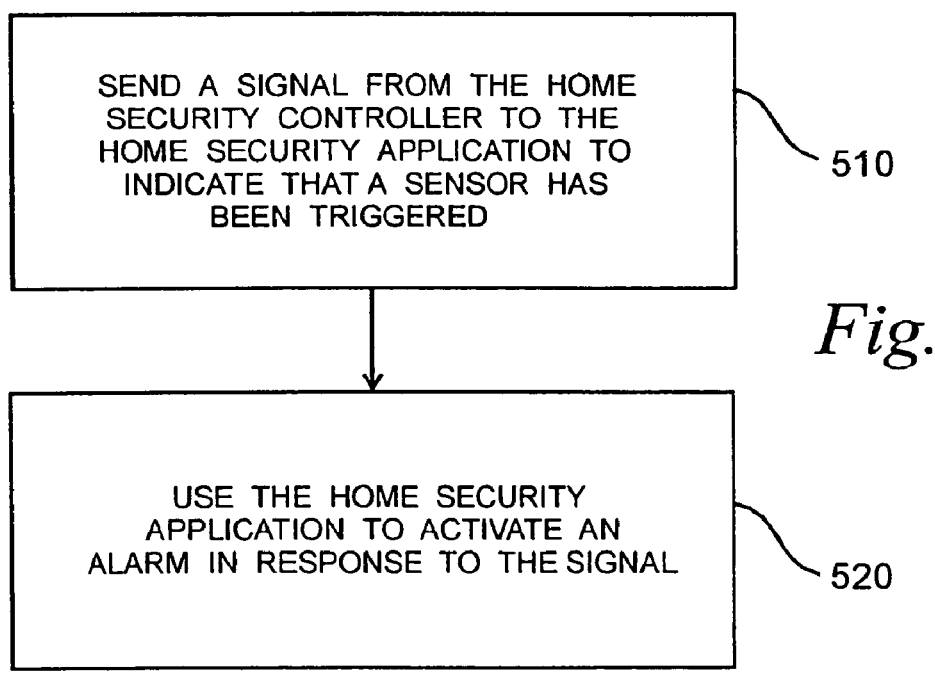
FIG. 5 is a flow chart of a home security method of a preferred embodiment.

Additionally, the system 300 of FIG. 3 can be used in a home security method, as illustrated in the flow chart of FIG. 5. This method comprises the steps of sending a signal from the home security controller 310 to the home security application 355 to indicate that a sensor 325 has been triggered (step 510) and using the home security application 355 to activate an alarm in response to the signal (step 520). For example, if the sensor 325 detects that a window has been opened in the customer premises, the controller 310 would generate a message describing the event and send the message to the application 355. The application 355 can automatically activate an alarm, or it can first determine whether the alarm should be activated. For example, the application 355 can be programmed to activate an alarm only if it has been informed that the customer premises 305 has no legitimate occupants. The alarm activation can be a triggering of an alerting device 327 in the customer premises 305 (e.g., sounding an alarm, turning on lights, etc.). As part of the alarm activation, the application 355 also can send a message to a monitoring bureau via the central office 340 and the PSTN 395. The methods of both FIGS. 4 and 5 can be implemented with a computer usable medium having computer readable program code means embodied therein.

As mentioned above, the system 300 of FIG. 3 provides more intensive computational and database resources and a more sophisticated user interface as compared to conventional systems. Additionally, the continuous connectivity access line 333 allows this system 300 to provide services that are not available with conventional systems. Each of these features will be described in more detail below.

Computational and Database Resources

With conventional systems, in-house devices have limited computational capabilities due to size and cost constraints. In contrast to in-house devices, the server 350 and application 355 of this preferred embodiment offer greater computational and database resources. Additionally, because the application 355 is centralized and is not part of the controller 310, a user is not limited to applications built into the controller 310 and can use applications from third-party vendors that may be better tailored to his needs. Unlike current systems, changing applications does not require change to customer premises equipment. Because the application 355 is centralized, these benefits can be shared by many users.

Because the computational resources of the centralized application server 350 are much larger than those of conventional in-house devices, the home security and automation application 355 can be written to take more intelligent action. For example, suppose that the application 355 is in an armed state and a window is opened at the time of day that children normally return home from school. Rather than immediately raising an alarm, the application 355 can use a speaker in the customer premises 305 to prompt the possible intruder/possible child-without-key to enter a security pass code. The application 355 also can have access to a much more complete database of information about home usage. For example, the application 355 can know that a cleaning service enters the home every Thursday at 1 p.m. If someone unlocks a door and enters at that time but does not enter a pass code, the application 355 would not necessary raise an alarm. The application 355, for example, can call the house and, using an interactive voice response system, prompt the service company personnel to enter his pass code over the telephone 315.

As another example, if other residences were equipped with the home automation and security system 300 of FIG. 3, children can be asked to enter a unique identifier into the security system at their friend's house if they went there rather than to their own house after school. Alternatively, if the child were wearing a transponder, their presence would automatically be announced to the automation system of any building they entered. The automation and security system at their friend's house can then send a message to the child's home application 355 (via the data network 360 or the PSTN 395), which then can record the child's location and report on it if requested to do so. Knowing the child is in another location, the application 355 can immediately activate an alerting device 327 once a sensor is activated 325 instead of assuming that the cause for the activation is the child returning home from school.

In another application, the application 355 can send messages to the controller 310 to turn on certain devices and activate certain alerting devices 327 in response to receiving an alert (e.g., civil defense warnings and severe weather alerts) from an information source coupled to the data network 360 or the PSTN 395. For example, if the controller 310 receives a "take cover" warning from a weather source because a tornado has been spotted in the vicinity, the controller 310 can turn on all the lights in the house, sound a siren, and broadcast an appropriate spoken message over the home public address system. Additionally, the application 355 can monitor a news channel and announce events in the news that are thought to be of pressing interest to the occupants. For example, a home owner can be told of train or traffic delays, and a family can be told of weather-related school closings.

As described above, the data network 360 can be coupled with larger databases than are available to the conventional home automation and security systems. With access to a larger database, a user has more control over, for example, VCR programming. The application 355 can monitor and track changes in the scheduled time of a program to automatically adjust the VCR programming to ensure that a desired program is recorded. Additionally, the application 355 can provide the user with a better interface through which to program the VCR. With conventional systems, program schedules are sent to a cable box or a specially-equipped television set for display to the user. The user navigates through a typically grid-like display on the television set and selects programs for recording. Because of memory limitations in set-top boxes or the circuitry of specially-equipped television sets, users typically have access to only a few days of program listings, and the listings include only terse descriptions of the programs. In contrast, the application 355 of this preferred embodiment can have access (via the data network 360) to information about many weeks of programming and detailed information about each program.

User Interface

Because the user interface is supported by a centralized server 350, the cost and size of the controller 310 does not limit the user interface, as in conventional systems. Accordingly, the computational resources available to the application 355 of this preferred embodiment can provide a more sophisticated user interface as compared to conventional systems. The system 300 of this preferred embodiment can communicate with a user via an interactive voice session, and because the server 350 can be a larger and more versatile machine than a conventional in-house unit, the dialog can be vastly easier for the user. When the application 355 is aware that it must communicate with the user over a standard telephone, it initiates an interactive voice session. An initial greeting is sent, and the user can respond by either dialing a touchtone digit or by speaking. Processing of voice commands can be done by a speech processing server 390 coupled with the data network 360. Using readily-available current technology, the speech processing server 390 can perform speaker-independent recognition or speaker verification.

In the course of the user's interaction with the home automation and security system 300, the user may inquire about the status of devices in the home, issue commands to change device status, or may change the way in which the application 355 responds to reported events. The user's dialog with the application 355 can result in messages being sent to the controller 310. For example, the user can call from a bedside phone to instruct the application 355 to enter a "night mode." The application 355 then can send a message to the controller 310 instructing it to turn off all lights under its control. A user instruction to enter night mode also can configure the application 355 to immediately respond to reports from in-home sensors 325 that a door or window was opened or that a motion detector was tripped. The nature of a response to an unexpected sensor event can be whatever the user deems appropriate. The application 355 can place a telephone call to the house, turn on house lighting, sound an alarm in the house, or place a call to a monitoring bureau. As described above, the service logic that determines what should be done when an event is detected in the home is in the application server 350. The controller 310 is responsible only for reporting events and sending control signals to devices when instructed to do so.

Figure 1:
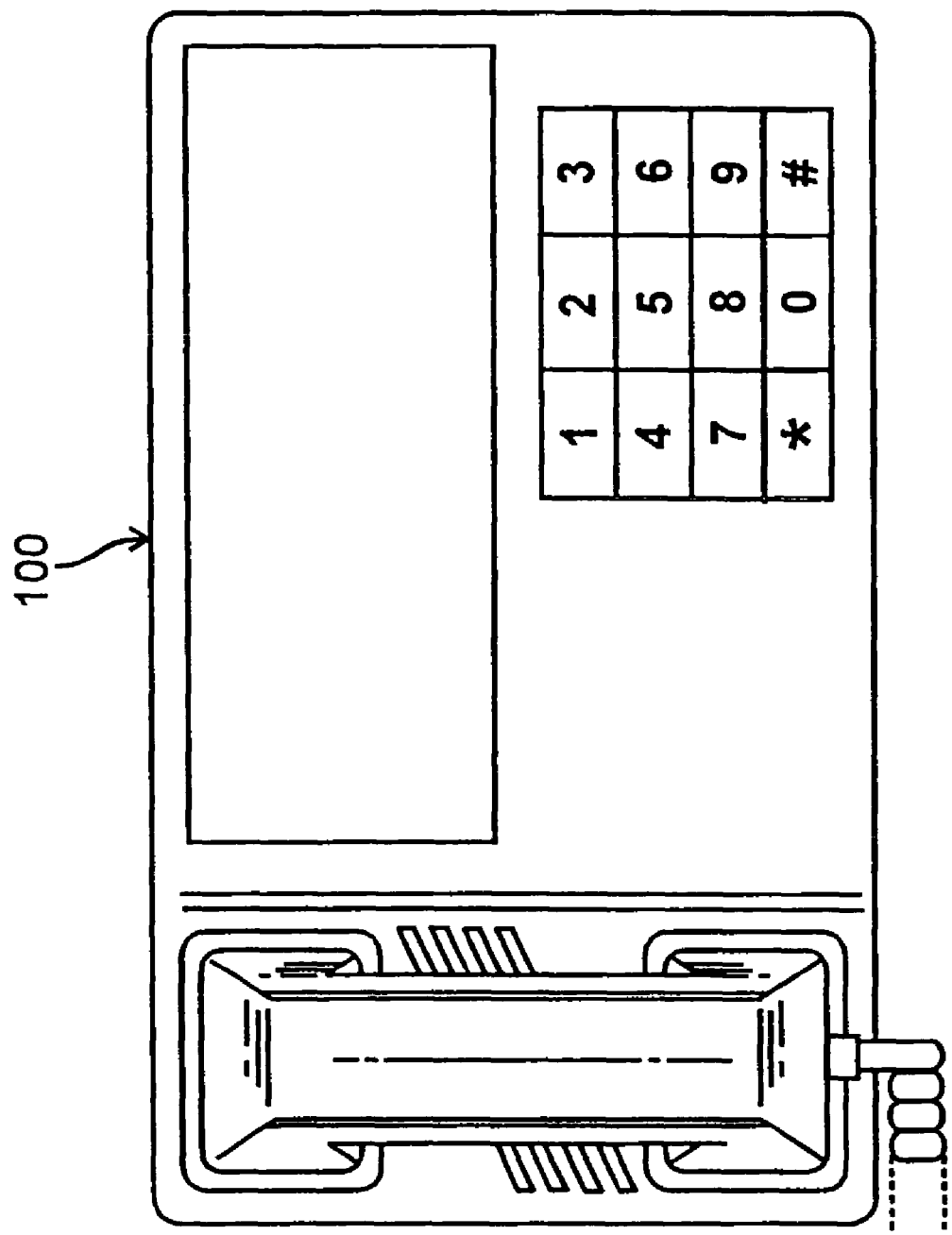
FIG. 1 is an illustration of a station set of a preferred embodiment.

A user can access the server 350 from within his home using the telephone 315 (e.g., a standard telephone station set 100 shown in FIG. 1). The user-interface controller 317 coupled with the telephone 315 can monitor the signals from the telephone 315 to determine whether the user is attempting to access the server 350 or is attempting to place a telephone call. When the telephone 315 goes off-hook, the user-interface controller 317 supplies a dial tone without passing the on-hook signal to the central office 340. In response to the user dialing anything other than a specified series of keys (such as ""), the user-interface controller 317 establishes a connection and passes the dialed digits to the central office 340. If the user dials the specified series of keys (such as ""), the telephone 315 connects to the home automation and security server 350 without an off-hook signal being sent to the central office 340. A message requesting initiation of a home automation and security system dialog is sent from the first 320 to the second 335 data-over-voice modem via the data channel of the access line 333 and finally to the gateway 345. The gateway 345 then sends an appropriate message to the server 350, which establishes a connection between the home automation and security controller 310 and the home automation and security application 355 running in the server 350.

In another embodiment, a user can access the application 355 with his home computer 313. As shown in FIG. 3, the computer 313 can be connected to the first data-over-voice modem 320 with a multiplexer 314 that also is coupled with the controller 310. The application 355 can provide the computer 313 with a highly graphical interface in the form of a "Web page." As described above, the application 355 communicates with the computer 313 using a data channel separate from the voice channel. Consequently, it is possible for someone on the premises to use the telephone 315 at the same that the application 355 is exchanging messages with the computer 313.

Figure 6:
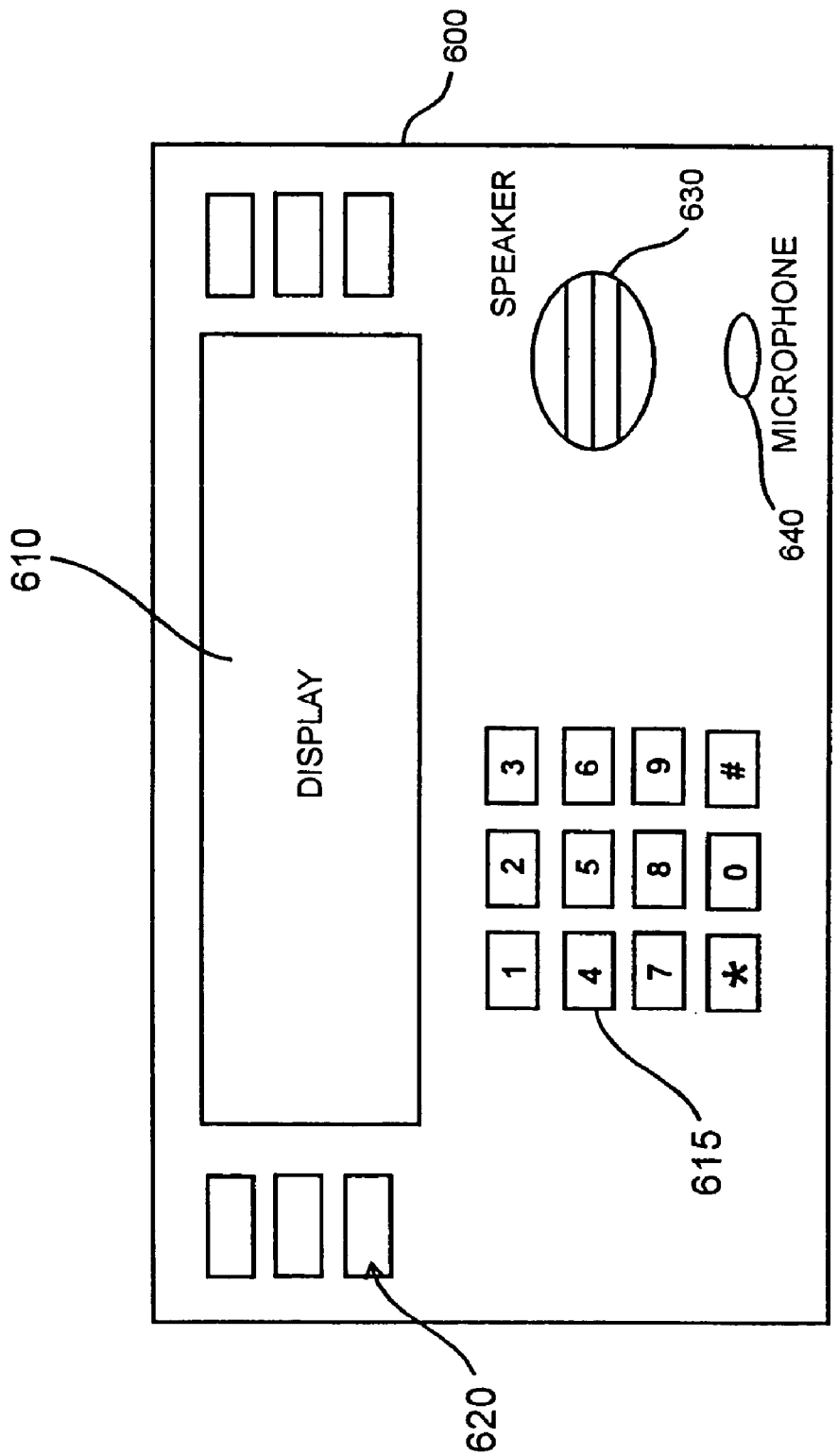
FIG. 6 is an illustration of a dedicated user interface device of a preferred embodiment.

In yet another embodiment, a dedicated user interface device 600 (FIG. 6) can be coupled with the controller 310 to access the application 355. The dedicated user interface device 600 comprises a display 610, preferably an LCD with eight lines, each with forty text characters per line. The display 610 also preferably comprises built-in graphical cells (i.e., icons). User input devices can include a keypad 615 (arranged, for example, as a touch-tone pad) and function keys 620, some of which can be located at each side of the display 610 and labeled by displaying appropriate icons or text strings. The dedicated user interface device 600 also can include a speaker 630 and a microphone 640 to support speech prompts and spoken user commands.

While the dedicated user interface device 600 and the controller 310 comprise some processing capability, the application 355 in the server 350 is in complete control of the user interface device 600. The application 355 determines what the user will see on the display 610 and hear over the speaker 630. The application 355 interprets all user inputs, button presses, touch-screen contacts and spoken commands. The application 355 can send a complete bit map of the screen or can send a character image showing which of a set of characters (e.g., ASCII characters, extended ASCII drawing characters, and pre-determined icons) should be displayed at a particular location on the display 610. The application 355 also can send a more abstract markup language representation. As is well known in the art, tradeoffs can be made either to conserve bandwidth by sending a higher-level representation or to minimize the need for processing capacity in the dedicated user interface device 600 by sending more literal descriptions of the screen.

The application 355 also can be accessed from a location remote from the customer premises 305. When the user is off premises, he can use an ordinary touchtone telephone to call the application 355. A user can place a telephone call to an access number, which can be routed from the central office 340 directly to the server 350 through a T1 line, for example, or indirectly through the gateway 345. The application 355 can communicate with the user via tone or speech prompts, and user responses can be either dialed touch-tone digits or spoken words. When a telephone is used to remotely access the application 355, a talking path can be established between the remote user and either a specialized voice I/O device in the customer premises 305 (e.g., a loudspeaker and microphone) or the regular home telephone 315. Speech to and from the home can be routed through the data channel of the access line 333 without using a normal telephone connection into the home. In this way, the remote user can talk to someone in the home, and the other home telephones still can be used for normal telephone calls. Additionally, a remote user can use the data channel to monitor activity in the house by receiving signals sent from the microphone of the specialized voice I/O device.

The user also can use a personal computer to remotely access the application. The computer can be coupled to the server 350 over the Internet 375 (or a private data network) or over a dial-up connection through the PSTN 395. In one embodiment, the server 350 functions as a Web server. After entering the server's 350 public home page, the user (after passing through a security check) can go to the page for their home automation and security system. This page can be designed to provide the appropriate status information and controls. In the course of the user's interaction with the application 355, the user can inquire about the status of devices in the home, issue commands to change device status, or change the way in which the application 355 manages home devices or responds to reported events. The application 355 is ultimately responsible for controlling all automated systems in the home. Alternatively, the application 355 can send commands to devices in the home to pre-program them to respond to local events.

In all of the above embodiments, because the application 355 communicates with the controller 310 using a data channel separate from the voice channel, someone on the premises 305 can use the telephone 315 at the same time that the application 355 is exchanging messages with the controller 310. The continuous connectivity access line 333 provides the system with additional advantages, as described below.

The Continuous Connectivity Access Line

The use of a continuous connectivity access line 333 also allows several services to be offered that are unavailable with current systems. For example, the system 300 of FIG. 3 can be used to send messages to utility companies describing current meter readings. Additionally, if the home security system is in "away mode," the home can be assumed to be unoccupied, and the thermostat controlling air conditioning can be set to a relatively high level without inconveniencing the home owner. Further, the application 355 can provide estimates to the utility company of how many air conditioning units can be set back and, hence, how much power can be saved.

As another feature, the system 300 can maintain a log of customer premises' entries and exits. A remote user can be provided with either real-time notification of changes in the security system status (e.g., the kids are home) or can peruse historical records. Further, cut-line protection can be provided at practically no additional cost because the application 355 will immediately be alerted if the access line becomes inoperable for any reason. The application 355 also can receive immediate notification of loss of residential power and can monitor the status of the backup system.

Figure 7:
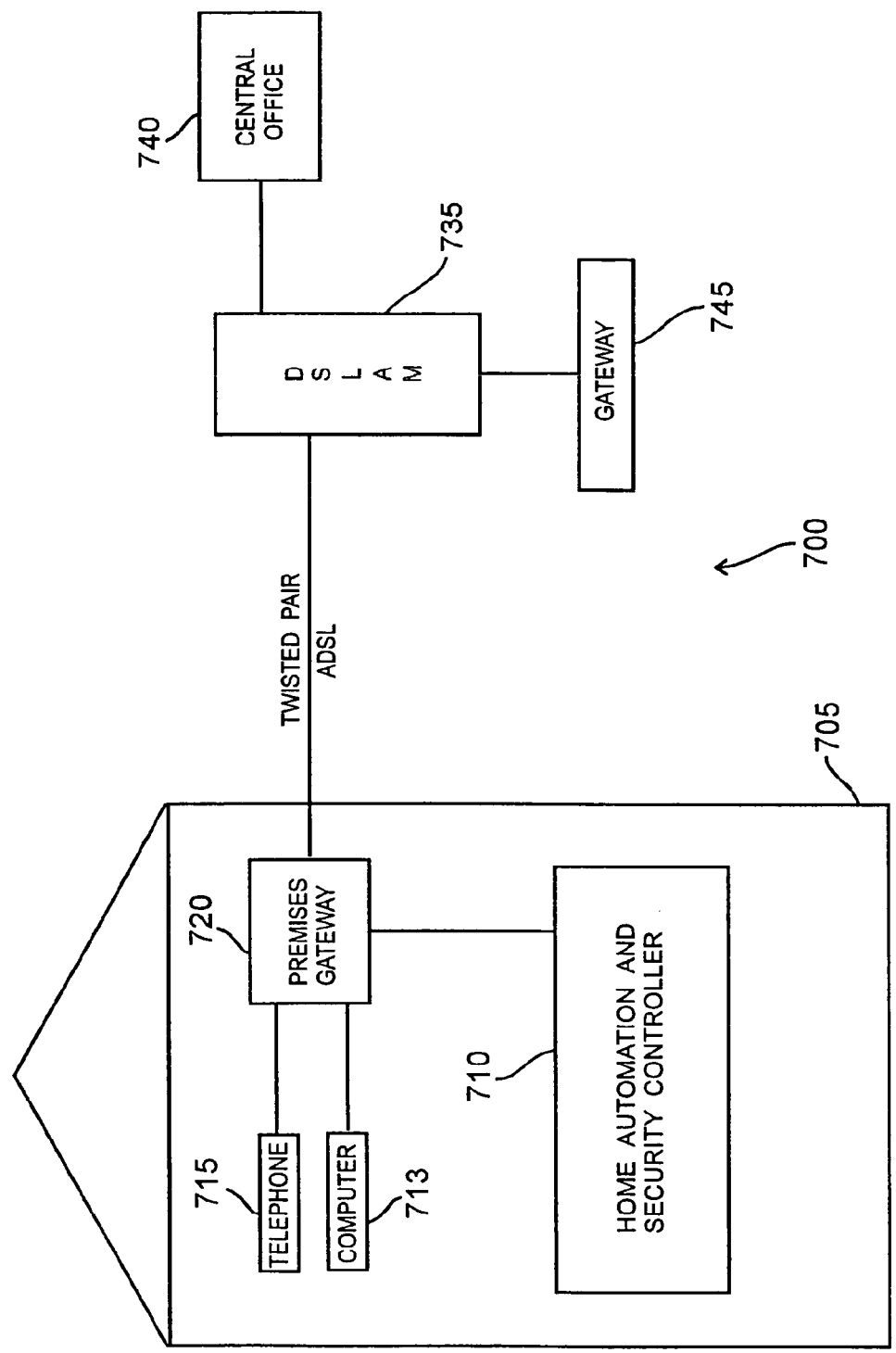
FIG. 7 is a block diagram of a home automation and security system of a preferred embodiment that uses a digital subscriber line.

While the embodiments have been described in reference to a continuous connectivity access line supported by data-over-voice modems, as mentioned above, the access line can also be supported by a digital subscriber line. FIG. 7 is a block diagram of some of the components of a home automation and security system 700 of a preferred embodiment using an asymmetrical digital subscribed line (ADSL). As shown in FIG. 7, the customer premises 705 comprises a premises gateway 720 coupled with a remotely located digital subscriber line access multiplexer ("DSLAM") 735 via a twisted pair. The premises gateway 720 combines voice traffic from telephones 715 and data traffic from the home automation and security controller 710. The premises gateway 720 also can combine data traffic from personal computers 713 coupled with an Ethernet, for example. The DSLAM 735 separates the traffic and sends the voice traffic to the central office 740 and the data traffic to the gateway 745. The additional elements shown in FIG. 3 can be added to enable this system 700 to perform all the functions described in reference to the system 300 of FIG. 3.

It is important to note that while the preferred embodiments were described above in terms of a home automation and security system, these two functions can exist independently. For example, while the home automation and security controller 310 is shown as one element, a system can comprise two controllers—one for home automation and one for home security. Alternatively, a customer premises may only have one controller, functioning as either a home automation controller or a home security controller.

It is intended that the foregoing detailed description be understood as an illustration of selected forms that the invention can take and not as a definition of the invention. It is only the following claims, including all equivalents, that are intended to define the scope of this invention.

What is claimed is:

1. A home automation system, comprising:
   a first computer implemented application corresponding to a first premises; and
   an expected occupancy schedule stored in association with the first application, wherein the first application is to receive a signal from a controller of a second premises indicative of an identity of a person located at the second premises, wherein the first application is to, when the person is associated with the expected occupancy schedule, record a location of the person as the second premises, and wherein the first application is to report the location of the person in response to a request.

2. A home automation system as defined in claim 1, wherein the first application is to use the expected occupancy schedule to determine whether a security system should be activated in response to receiving a security signal.

3. A home automation system as defined in claim 1, wherein the controller is to send the signal indicative of the identity of the person in response to detecting a transponder associated with the person.

4. A home automation system as defined in claim 1, wherein the controller is to send the signal indicative of the identity of the person in response to receiving an identifier associated with the person.

5. A home automation system as defined in claim 1, wherein the first application is implemented on a server remotely located from the first premises.

6. A home automation system as defined in claim 1, wherein the first application is to adjust the expected occupancy schedule based on the location of the person being the second premises.

7. A home automation system as defined in claim 1, further comprising a network coupling a server implementing the first application to the first premises.

8. A home automation system as defined in claim 1, wherein the first premises is communicatively coupled to a home automation and security server via a central office over a continuous connectivity access line.

9. A method of operating a home automation system, comprising:
    detecting a presence of a person at a first premises via a first controller associated with a first application of a home automation system, wherein the person is a resident of a second premises; and
    sending a signal indicative of the presence of the person at the first premises to a second application associated with the second premises, wherein the second application is to alter an expected occupancy schedule having information related to an expected occupancy of the second premises based on the signal, and wherein the expected occupancy schedule is to be used to determine whether a security system should be activated in response to receiving a security signal from a second controller associated with the second premises.

10. A method as defined in claim 9, wherein detecting the presence of the person at the first premises comprises detecting a transponder associated with the person.

11. A method as defined in claim 9, wherein detecting the presence of the person at the first premises comprises receiving an identifier associated with the person.

12. A method as defined in claim 9, further comprising generating a report including information related to the adjusting of the expected occupancy schedule.

13. A method as defined in claim 9, wherein the first application is implemented on a server remotely located from the first premises.

14. A method as defined in claim 9, wherein the first premises and the second premises are communicatively coupled via a home automation and security server.

15. A method as defined in claim 9, further comprising a network coupling a server implementing the first application to the first premises.

16. A home automation system, comprising:
    a first controller to:
        detect a presence of a person at a first premises, wherein the person is a resident of a second premises; and
        send a message indicative of the presence of the person at the first premises to an application associated with the second premises, wherein the application is to alter an expected occupancy schedule having information related to an expected occupancy of the second premises based on the message, and wherein the expected occupancy schedule is to be used to determine whether a security system should be activated in response to receiving a security signal from a second controller associated with the second premises.

17. A home automation system as defined in claim 16, wherein the first controller is to prompt the person for an identifier in response to the person entering the first premises.

18. A home automation system as defined in claim 16, wherein the first controller is to send the message in response to detecting a transponder associated with the person.

19. A home automation system as defined in claim 16, wherein the first controller is to send the message in response to receiving an identifier associated with the person.

20. A home automation system as defined in claim 16, wherein the application is implemented on a server remotely located from the second premises.

* * * * *